United States Patent [19]

Arimoto et al.

[11] Patent Number: 4,806,951

[45] Date of Patent: Feb. 21, 1989

[54] OPTICAL PRINTER

[75] Inventors: Akira Arimoto, Kodaira; Susumu Saito, Hachiouji; Takeshi Mochizuki, Mito, all of Japan

[73] Assignees: Hitachi Koki Co., Ltd.; Hitachi Ltd., both of Tokyo, Japan

[21] Appl. No.: 153,005

[22] Filed: Feb. 8, 1988

[30] Foreign Application Priority Data

Mar. 6, 1987 [JP] Japan .................................. 62-50096

[51] Int. Cl.[4] ...................... G01D 9/42; G01D 15/14; H04N 1/23
[52] U.S. Cl. .................................... 346/108; 346/160; 358/300
[58] Field of Search ................ 346/108, 160; 358/300, 358/75

[56] References Cited

U.S. PATENT DOCUMENTS

| | | | |
|---|---|---|---|
| 4,053,898 | 10/1977 | Hirayama et al. | 346/108 X |
| 4,253,102 | 2/1981 | Kataoka et al. | 346/108 |
| 4,276,561 | 6/1981 | Friedman | 358/78 |
| 4,393,387 | 7/1983 | Kitamura | 346/108 |
| 4,566,043 | 1/1986 | Tamura | 346/108 X |
| 4,591,903 | 5/1986 | Kawamura et al. | 358/75 |

Primary Examiner—George H. Miller, Jr.
Attorney, Agent, or Firm—Antonelli, Terry & Wands

[57] ABSTRACT

An optical printer using laser beams, wherein, when a plurality (n) of laser beams are used at once to carry out a scanning operation, the positions of spots of said laser beams in both the primary scanning direction and sub-scanning direction are set so as to have the relation $l=(n-1)a+m\cdot n\cdot a$, wherein m is a positive integer ($m \geq 1$); a the distance between the adjacent scanning lines in the sub-scanning direction on the printing surface of the optical printer after a printing operation; and l the distance between the adjacent laser beams in the sub-scanning direction on the surface of a photosensitive drum, whereby a high-quality printing effecting no overlapping and omission of images can be obtained even if the distance between the adjacent laser beams is increased during a scanning operation using a plurality of laser beams at once.

4 Claims, 11 Drawing Sheets $\ell' = a' + 2ma'$

OPTICAL PRINTER

BACKGROUND OF THE INVENTION

This invention relates to an optical printer in which a photosensitive body is exposed to laser beams applied thereto so as to scan the same therewith one-dimensionally (linearly) is moved in the direction which is at right angles to these laser beams, and more particularly to an optical printer used effectively for applying a plurality of laser beams at once to a photosensitive body so as to scan the same.

In a prior art laser printer, a photosensitive body is generally scanned with a single laser beam by using a rotary polygon mirror. Recently, with a view to satisfying a demand for a higher-speed printing operation, and, owing to the progress of the practical use of a semiconductor laser array, a printer in which a plurality of laser beams are used at once for scanning a photosensitive body therewith has been developed. In a conventional scanning operation using a plurality of laser beams, a one-by-one scanning method is generally employed, in which the scanning is done successively from the upper portion of an image plane by using N laser beams, in such a manner that first to Nth scanning operations are carried out at once initially with N+1st to 2Nth scanning operations carried out at once subsequently. As a matter of fact, in an array using a semiconductor laser, the size of the emitting point is 1–3 $\mu\phi$. Therefore, in order to carry out a scanning operation densely, it is necessary to form the array densely and set the intervals among the lasers to around 1–3 $\mu m\phi$. However, if the lasers are put so close to one another, thermal and electric crosstalk occurs, or the optical resonators influence each other, so that each laser stops working as an independent light source. Consequently, it is necessary that the lasers be spaced from one another to a certain extent to minimize the crosstalk among the lasers.

Therefore, it is difficult to set the space between two adjacent emitting points in a laser array used for a conventional laser printer to not more than 50 $\mu$m. In order to obtain a neighboring line sequential scanning mode, a method of disposing a laser array 1 incliningly as shown in FIG. 1 is employed (refer to Japanese Patent Laid-Open No. 158251/1979 and its corresponding U.S. Pat. No. 4,253,102).

To practice this method, it is necessary that the laser array as a whole be turned in the substantially horizontal direction to dispose the same at an angle $\theta$ shown in FIG. 1. However, when this angle $\theta$ is too large under such circumstances, a scanning line is superposed on the adjacent scanning line or separated therefrom if a very small error occurs in the angle thus set. Therefore, it is necessary to set this angle $\theta$ to the lowest possible level. During this time, the plane including the emitting points of the lasers and the printing surface form a geometrooptic conjugate point.

Even when a printer formed by using a plurality of laser beam sources in which the lasers are arranged in a discrete manner, and not in the manner as in a laser array, is employed, it is necessary that the positions of the laser beam sources be regulated to correct the variations with the lapse of time of the mutual distances among the laser beam sources. In order to a range the lasers close to one another as mentioned above, it is necessary that the emitting points be arranged densely. Examples of the optical printer in which the lasers are arranged with the emitting points positioned close to one another are disclosed in U.S. Pat. No. 4,644,160 and Japanese Patent Laid-Open No. 166916/1985. FIG. 2 illustrates such an example. The laser beams 21, 22 emitted from two lasers 11, 12 are introduced in substantially the same direction by a prism 10 to an optical system shown in FIG. 2 and consisting of a rotating polygonal mirror 5 and a F$\theta$ lens 6. Reference numerals 91, 92 denote known actuators, and 41, 42 known controllers for use of controlling these actuators. In order to fixedly space two laser spots 71, 72 on the surface to be scanned, from each other by a predetermined distance, a part of each of the beams from the lasers is introduced into four divisional photodetectors $A_1$–$A_4$ so as to form one spot on the light-receiving portions $A_1$, $A_2$ and the other spot on the light-receiving portions $A_3$, $A_4$; and $B_1$–$B_2$, $B_3$–$B_4$ are then determined as shown in the drawing, by using the output signals (detected signals) $B_1$–$B_4$ obtained from these light-receiving portions. The signals thus obtained are used as spot control signals, and optical reflectors 3, 4 are actuated so as to maintain the spots in predetermined positions constantly stable. During this time, the diameter of the optical spots 71, 72, which are moved in the sub-scanning direction, and that of the spots 771, 772 in the sub-scanning direction on the four divisional photodetectors are maintained so as to have geometrooptical conjugate relation (with a magnification M). Accordingly, the diameter of the photodetectors and the distance between the two spots are equal to the products of the diameter of the spots and the distance between these spots on the surface to be scanned and the magnification M. In the case where a scanning operation is carried out over the neighboring lines by using two laser beams, the four divisional photodetectors are arranged in contact in the subscanning direction as shown in FIG. 3, and laser spots 781, 782 have to be formed accurately on the light-receiving portions ($A_1$, $A_2$), ($A_3$, $A_4$) as shown in the drawing respectively. There is the possibility that, for example, the spot 781 is formed on the light-receiving portion ($A_3$, $A_4$) in a regularly directed state or in a contrariwise directed state due to a certain noise or error. In such a case, crosstalk occurs, and it becomes difficult to control the spots independently of each other. Consequently, it is necessary to solve the problems so that the light-receiving portions ($A_1$, $A_2$), ($A_3$, $A_4$) can be spaced from each other without causing any troubles.

The problems of the intervals of the scanning lines in the sub-scanning direction in an optical printer using a plurality of laser beams have heretofore been described. The problems of the positional relation in the primary scanning direction between the laser beams will now be additionally described.

A method of detecting the positions of the scanning laser beams in the primary scanning direction on the basis of the time at which the laser beams pass the photodetectors provided at the end of a surface to be scanned has been practically used. The conventional methods of more accurately detecting the positions of the scanning laser beams in the main scanning direction include a system (Japanese Patent Laid-Open No. 61545/1979), in which two divisional detectors 81, 82 separated in the main scanning direction as shown in FIG. 4 are used, a laser beam 52 with which a photosensitive drum 51 has been scanned by a reflector 53 being detected on the basis of outputs obtained from these two detectors 81, 82 by the differential operations thereof, and the position (time) at which the laser beam passes the detectors being determined on the basis of the position of the zero intersection of these outputs. However, in spite of the presence of this system, such two photodetectors are not used but a single photodetector is used in all cases to detect the position of the scanning laser beam on the basis of an output from this photodetector. The reasons why an optical printer using a single photodetector is employed are as follows. When a single laser is used, the level of an output therefrom does not vary in a short period of time, and an operation for detecting the position of the beam is little influenced by this output. Therefore, it is considered that the detection of the position of the laser beam can be done with no particular troubles even by a single detector. However, when a plurality of lasers are used, in which a constant difference between the outputs therefrom occurs, it becomes impossible to determine the positions of the laser beams accurately by a single photodetector. FIG. 5 shows the influence of difference between the outputs from a plurality of lasers. A case where the laser outputs scatter as shown by reference numerals 1001-1003 will now be discussed. If there is a difference between the outputs from a plurality of lasers by this method, in which a threshold value 101 is set in a certain level of the laser outputs to thereby determine the positions of the laser beams, the time signals 1021-1023 obtained from the threshold level 101 are found not to accurately indicate the positions of the laser beams even when the diameters of the optical spots are set equal.

In order to scan a photosensitive body with a plurality of laser beams in a conventional optical printer, it is desirable to carry but a neighboring line sequential scanning operation for the signal processing convenience. In spite of this fact, it is practically very difficult to provide an optical system suitable for the sequential scanning due to various optical and mechanical requirements.

SUMMARY OF THE INVENTION

An object of the present invention is to provide an optical printer employing a novel system capable of printing without causing the overlapping and omission of scanning lines even when the space between the scanning beams applied at once to a photosensitive body is increased.

Another object of the present invention is to provide an optical printer capable of obtaining a high-quality printing with no overlapping and omission of scanning lines by accurately grasping the positional relation of a plurality of laser beams emitted in the main scanning direction.

To achieve these objects, the present invention provides an optical printer capable of carrying out the beautiful high-quality multi-line printing by setting the positions of the spots of a plurality of laser beams, which are used at once to carry out a scanning operation, in the main and subscanning directions to suitable values, or accurately determining these positions by photodetectors.

DESCRIPTION OF THE PREFERRED EMBODIMENTS

The optical printer according to the present invention using n fluxes of laser beams keeps the relation of $$l = (n-1)a + m \cdot n \cdot a \qquad (1)$$

wherein l is an integer of $m > 1$; a the distance in the sub-scanning direction between the adjacent spots of laser beams on the printing surface of the optical printer after a printing operation; and l the distance in the sub-scanning direction between the adjacent laser beams on the surface of a photosensitive drum, so as to prevent the overlapping of the scanning beams in the sub-scanning direction and the omission thereof. Owing to this construction, the simultaneous optical scanning can be done without causing the omission of the scanning lines except the omission of several scanning lines at a printing starting stage even if the neighboring lines are not sequentially scanned with the laser beams.

In the main scanning direction, divisional photodetectors are disposed in the positions which are on the outer side of a print span, and which correspond to a laser beam scanning end, to accurately determine the time at which the laser beams pass over the photodetectors and thereby make sure of the positions of the laser beams. If the laser beams are controlled with reference to these positions, the high-quality printing can be done even when the output levels of these laser beams vary.

The operation of the present invention will now be described.

Figure 6:
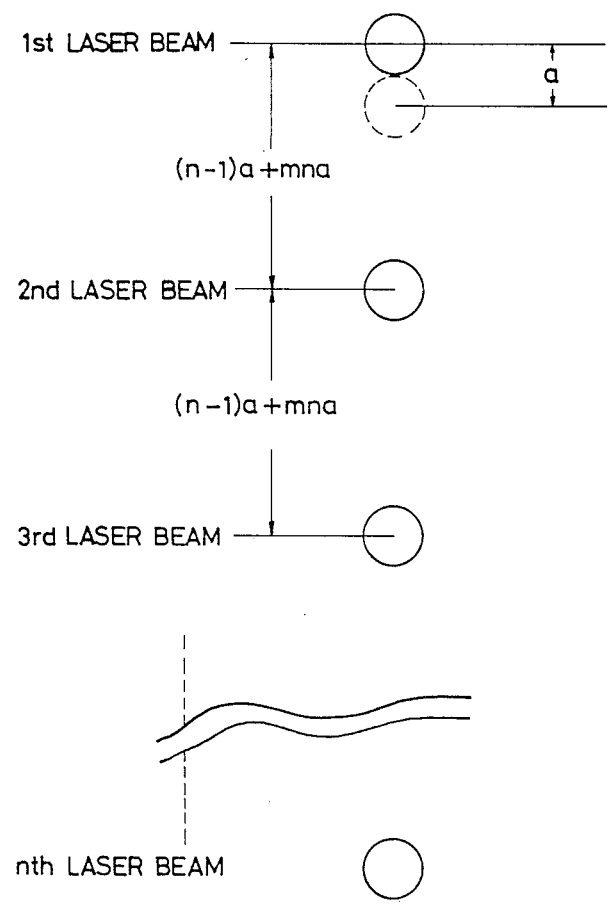
FIG. 6 illustrates the basic conception of the operation of the present invention.

FIG. 6 shows the distance in the sub-scanning direction between laser beams on a photosensitive drum in the optical printer using n fluxes of laser beams. Referring to the drawing the positions illustrated indicate the positions of the first to nth laser beams. The possibility that an optical scanning operation is carried out without troubles under such conditions will now be described with reference to the concrete examples shown in FIG. 7.

Figure 7:
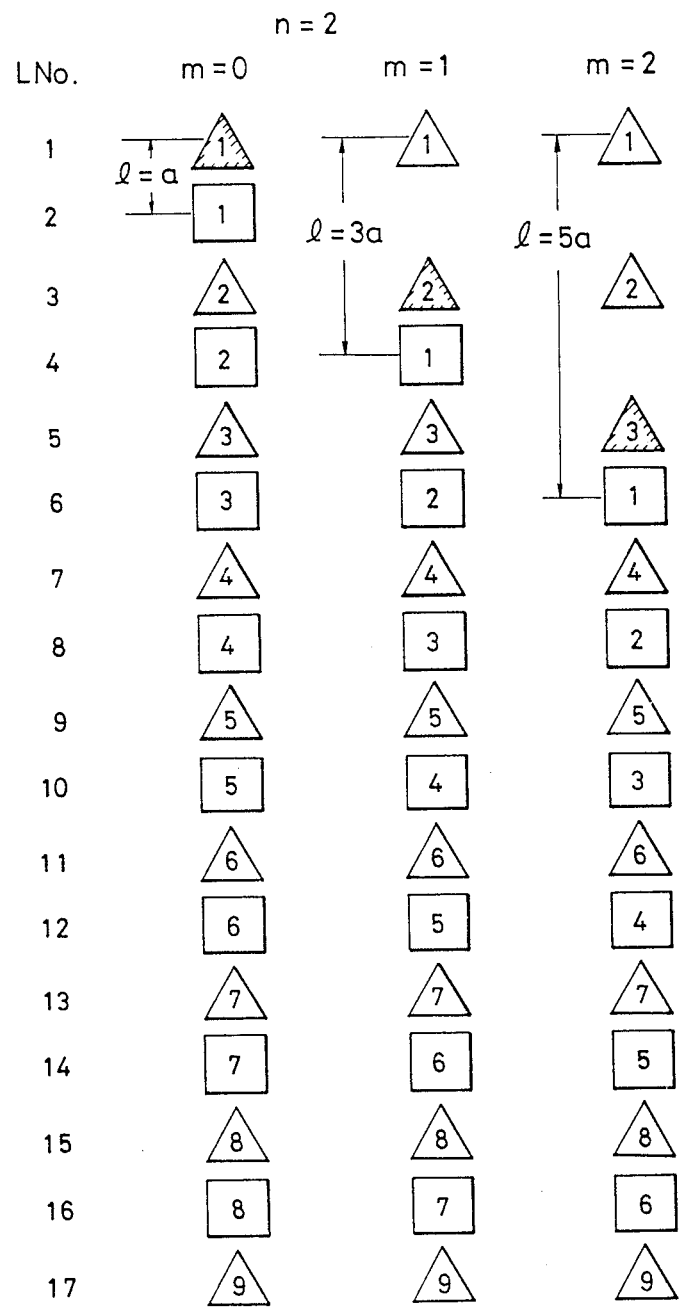
FIG. 7 illustrates the operation of an embodiment of the present invention to show the possibility of carrying out an optical scanning operation using two laser beams without causing the overlapping and omission of images.

FIG. 7 shows the positional relation between two laser beams (n=2) in use. Referring to the drawing, the numerals shown under "L No." indicate the numbers for the scanning lines counted down from the upper side, and the FIGS. Δ, □ two laser beams. The numerals P put in the Δ, □ in order represent the Pth optical scanning operations. In a conventional example in which the distance l between two lasers is equal to a (as shown in the drawing) with m=0, the optical scanning is done sequentially from the upper side. However, when m=1, L Nos. 1 and 4 are printed in the first optical scanning operation, L Nos. 3 and 6 in the second optical scanning operation, and L Nos. 5 and 8 in the third scanning operation. Accordingly, information can be printed closely on L No. 3 and above. When m=2, the laser beams are present and the scanning is done on L Nos. 1 and 6 in the first scanning operation, L Nos. 3 and 8 in the second scanning operation, and L Nos. 5 and 10 in the third scanning operations. Therefore, the scanning operations can be done on all L Nos. larger than 5.

Namely, in order that the information be closely printed, the scanning operations may be carried out on the scanning lines the L Nos. of which are equal to and larger than that of the scanning line corresponding to the position of a hatched triangle in the drawing.

Figure 8:
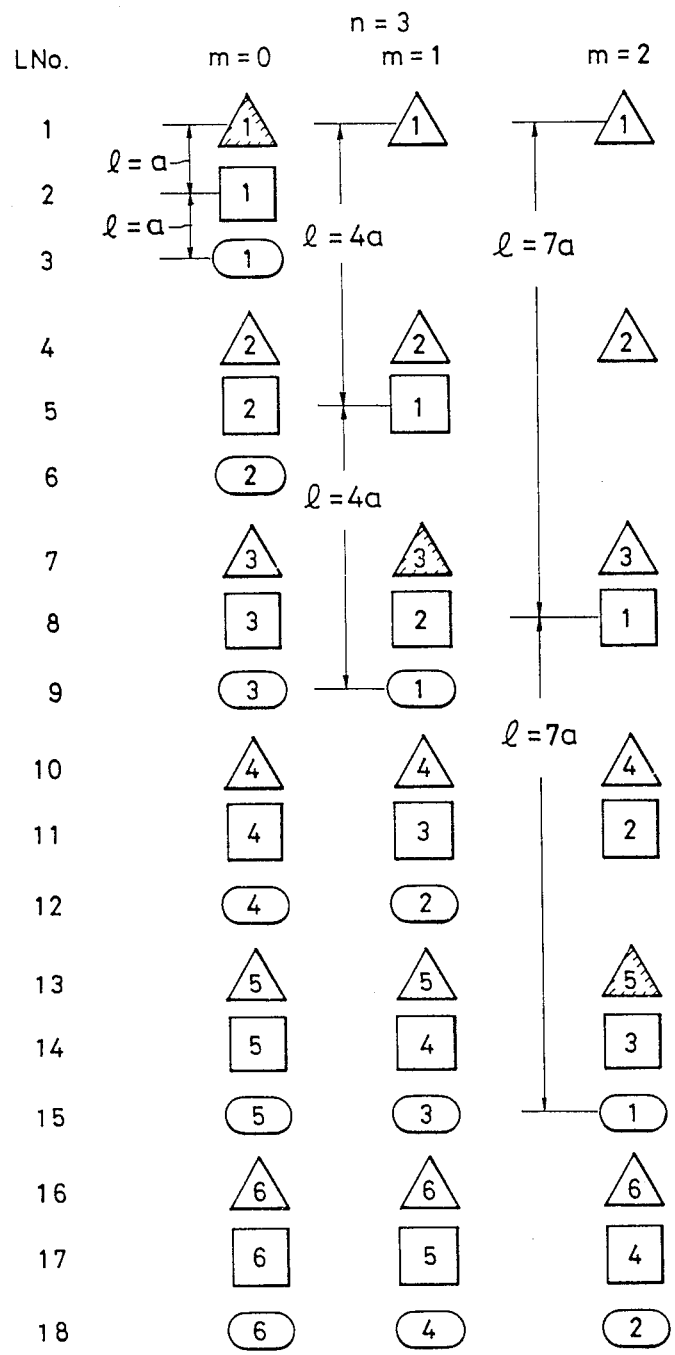
FIG. 8 illustrates the operation of an embodiment of the prevent invention using three laser beams.

FIG. 8 shows the positional relation between the laser beams when n=3, in which three laser beams are represented by Δ, □, ○. The definitions of L No. and m are the same as those of the same number and letter in the case of FIG. 7, and l in the case of FIG. 8 satisfies the equation (1). This means that the optical scanning can be done even when m is not zero.

Figure 9:
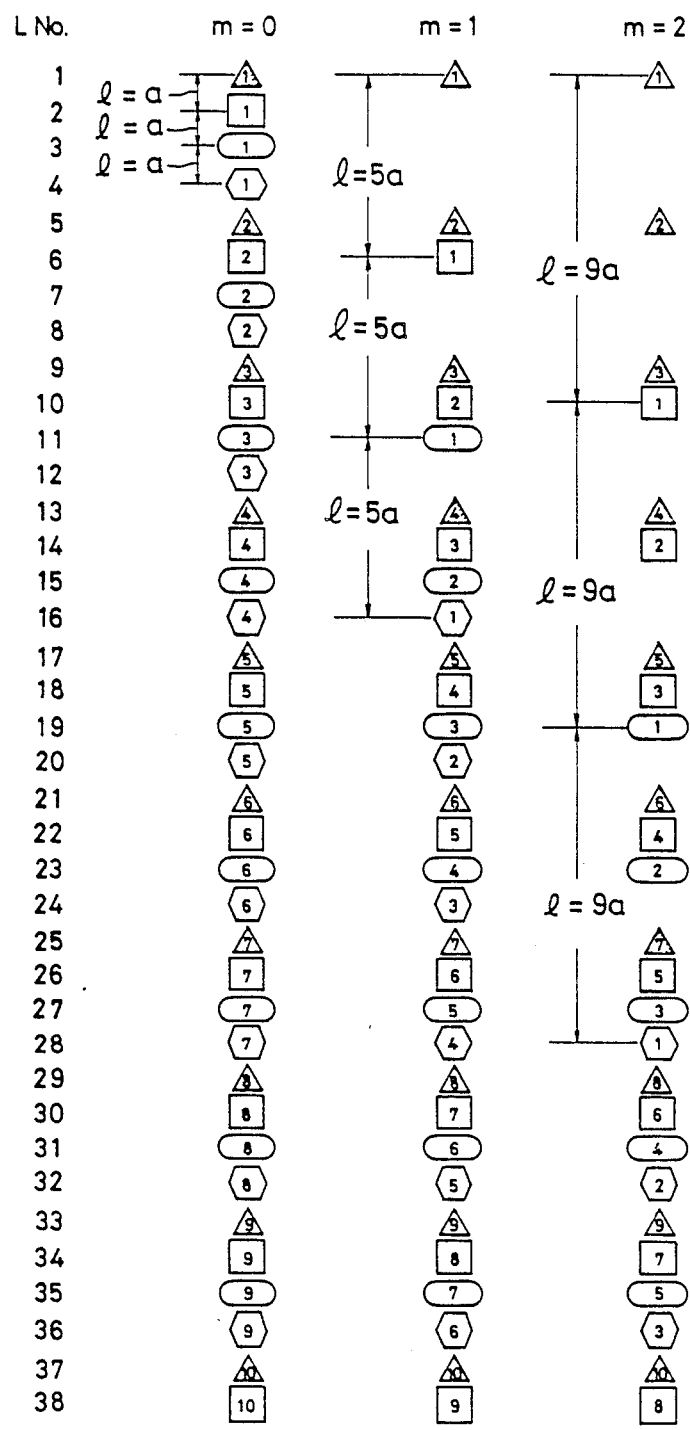
FIG. 9 illustrates the operation of an embodiment of the present invention using four laser beams.

FIG. 9 shows an embodiment in which n=4, Δ, □, ○ representing four laser beams. This indicates that, if the laser beams are spaced from one another in accordance with the equation (1) in the same manner as in the embodiments of n=2 and n=3, the scanning operations can be done on all L Nos. except several scanning lines corresponding to the initial stage of the scanning operation.

When an optical printer is formed by laser beams having an interval l for example, l=2a, 3a, ...) larger than the interval a of the printing scanning lines, the omission of several scanning lines occurs immediately after the starting of a scanning operation. However, it is considered that the omission of the scanning lines has substantially no influence upon the optical printing of information unless L No. has exceeded 200 since the printing starts actually at an edge of paper, and since the printing of information is not done in many cases on a 2-3 mm wide space at the edge portion of paper in a printing operation of a regular optical printer in which the pitch of the scanning lines is 30-100 μm.

Although the omission of scanning lines also occurs immediately before the completion of a printing operation, this does not substantially raise any problems because such omission of scanning lines occurs at the portion of the paper which is in the vicinity of the edge or fold line thereof.

The data in this embodiment are different from those in the case where m=0, and the signals from a computer cannot be sent out sequentially in the embodiment of FIG. 9. However, if a buffer memory of a certain region is provided as shown in FIG. 10, it is easy to send out the information of a suitable address into a laser beam, so that controlling troubles rarely occur.

Figure 10:
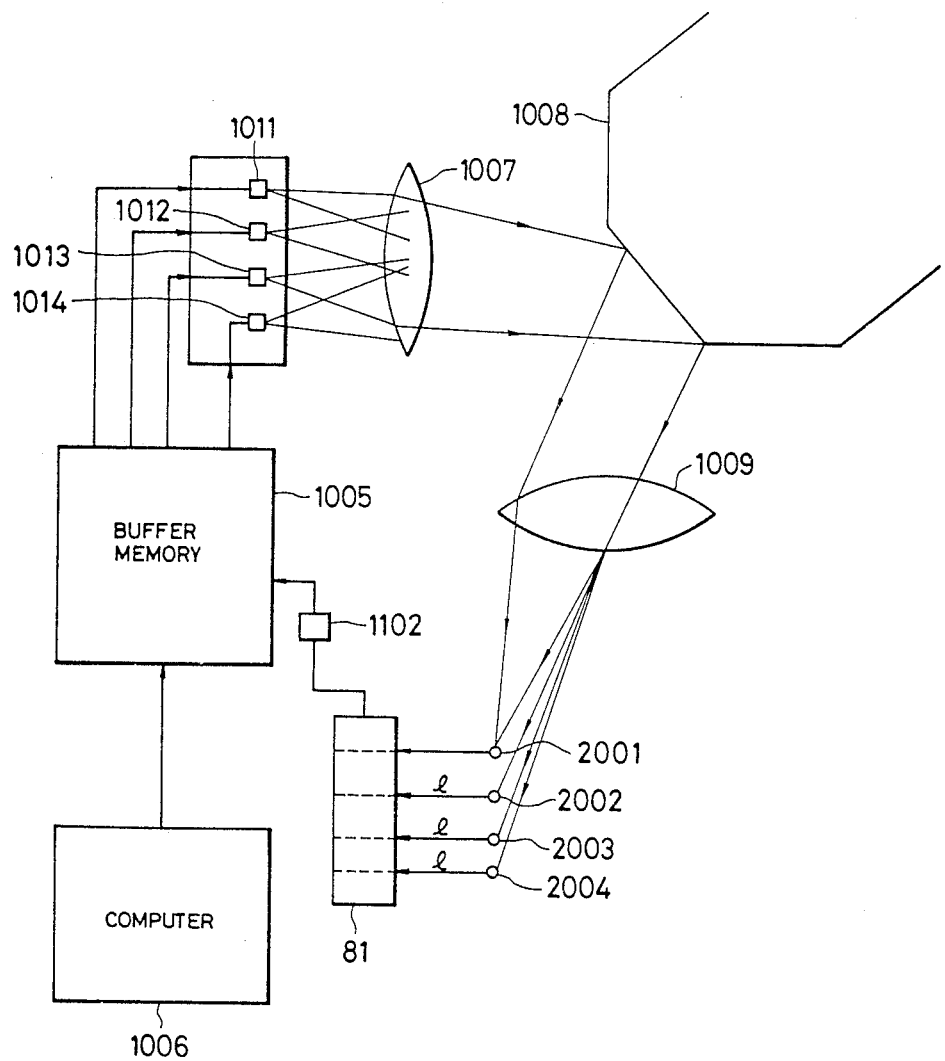
FIG. 10 schematically shows the construction of an optical printer using four lasers.

FIG. 10 shows a first embodiment of a laser printer using a plurality (n=4) of lasers. Reference numerals 1011-1014 denote semiconductor lasers (which may consist of an array or a combination of a plurality of simple-substance lasers), 1005 a buffer memory (including a controller) storing printing data for one page, and 1006 a computer adapted to control the printer through the buffer memory 1005 on the basis of the results of computation. The data on the information to be printed which are inputted from the computer 1006 into the buffer memory are transmitted to the semiconductor lasers 1011, 1012, ... 1014 by using an address signal generated on the basis of the equation (1), and these lasers are driven by this data signal. The laser beams from these lasers are used for a scanning operation through a collimator lens 1007, a rotary polygon mirror 1008 and Fθ lens 1009. Reference numerals 2001-2004 denote scanning spots used for a scanning operation in a one-dimensional direction in accordance with the movement of the rotary polygon mirror 1008.

If the distance l between the laser spots in this embodiment is set to a level determined in accordance with the equation (1) on the basis of n, a, m with the data from the buffer memory 1005 taken suitably, the optical scanning using a plurality of laser beams simultaneously can be done without causing the overlapping and omission of the laser beams. The distance l can be set to a predetermined level by regulating the same on the basis of multiplication $$d \times f_2/f_1 \qquad (2)$$

of the distance between the adjacent semiconductor laser beam sources 1011-1014 regularly arranged by a ratio of the focal length $f_1$ of the collimator lens 1007 to that $f_2$ of the Fθ lens 1009. To make such adjustments, these parts may be formed so that at least one of d, $f_1$, $f_2$ can be regulated (illustration is omitted).

Figure 11:
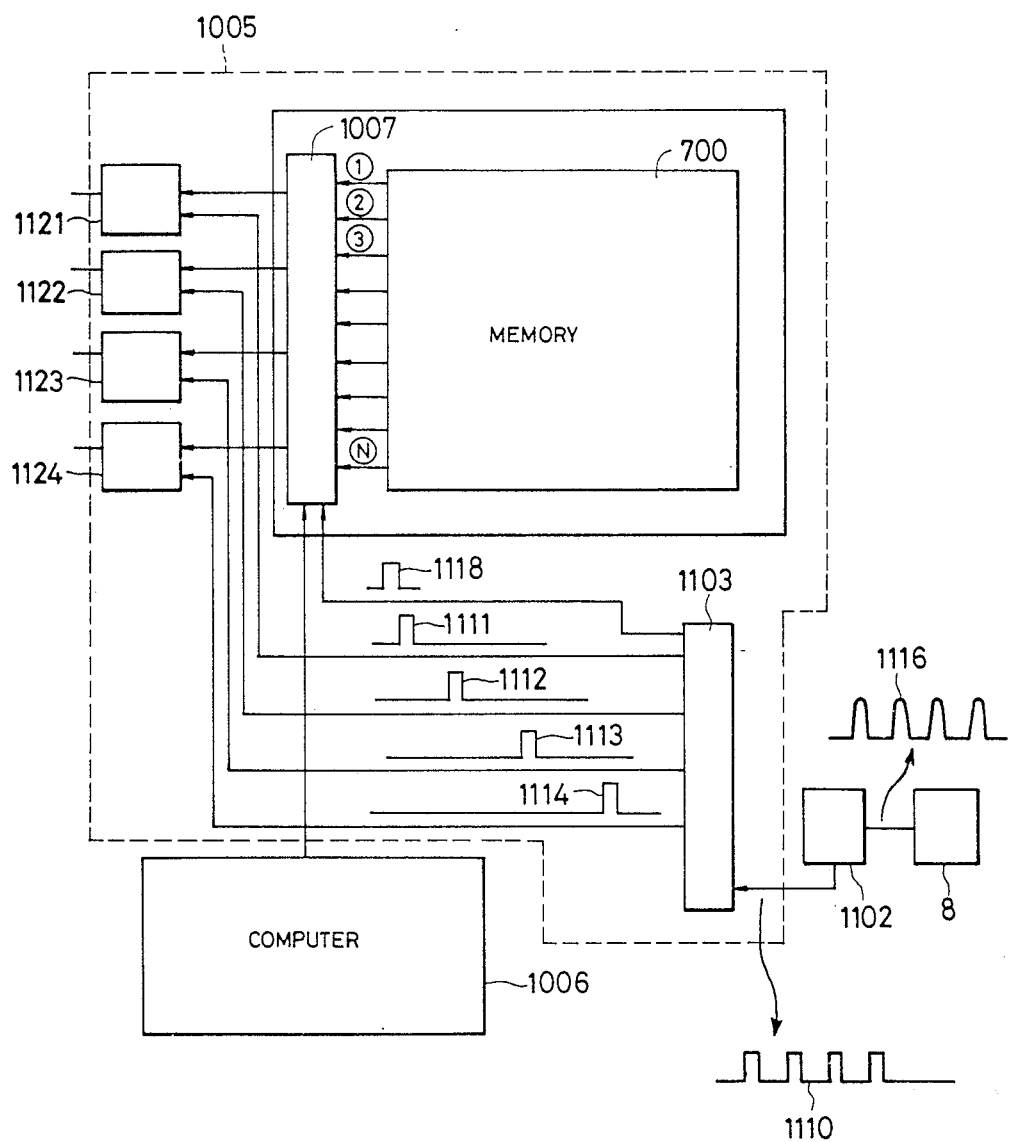
FIG. 11 is a construction diagram illustrating the relation between a buffer memory and the reading of data.

The relation between the buffer memory 1005 and the reading of data will now be described more in detail with reference to FIG. 11. The portion encompassed by a dotted line constitutes the buffer memory. A memory body 700 contains the data for N line printing which are sent from the computer 1006. The lines have address lines ①–Ⓝ, and are connected to a data distribution coupler 1007. The outputs 1116 of the laser beams obtained at a photodetector 8 for scanning positions pass through an amplifier 1102 and turn into binary signals 1110, which pass through a distributor 1103 and turn into signals 1111, 1112, 1113, 1114. These signals are applied to laser drivers 1121, 1122, 1123, 1124. A scanning starting signal 1118 is also sent from the distributor 1103 to the distribution coupler 1007. Since the number of a scanning operation to be started can be determined by the signal 1118, the memory 700 and laser drivers 1121-1124 are connected sequentially in accordance with the regulations given by the equation (1). The drivers 1121-1124 receive the signals 1111-1114 representative of detected positions from the distributor 1103, and send the signals from the buffer memory 700 to the semiconductor lasers.

The second embodiment of the present invention will now be described with reference to FIG. 12.

Figure 13:
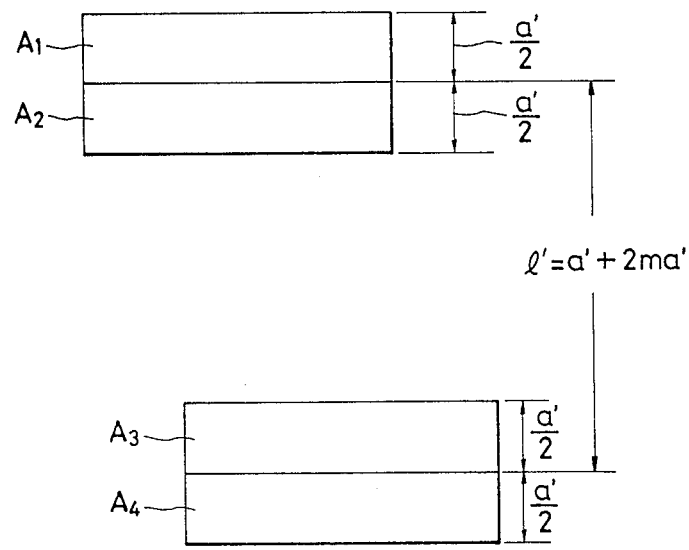
FIG. 13 illustrates an example of arrangement of the photodetectors used in the embodiment of FIG. 12.

Reference numerals 11, 12 denote semiconductor lasers, and reference letters $A_1$, $A_2$, $A_3$, $A_4$ divisional photodetectors for use of detecting the distance between sub-scanning lines. Reference numeral 10 denotes a prism for introducing the greater part of the laser beams into a scanning system, and a part thereof into the photodetectors $A_1$-$A_4$, and 81, 82 photodetectors which are placed in a position outside the print span and at the end of a surface to be scanned with the laser beams, and which border each other in the primary scanning direction. The position in which the photodetectors $A_1$-$A_4$ are disposed and a surface (the surface of a photosensitive drum 200 to which the light is applied) to be scanned have geometrooptically conjugate image-forming relation with respect to the sub-scanning direction. Accordingly, the ratio of the distance between two scanning lines on the surface to be scanned to the diameter of the condensed spots in the sub-scanning direction becomes equal to that of the distance between two laser spots on the surfaces of the photodetectors $A_1$-$A_4$ to the diameter of the spots. Therefore, the positions may be detected on the surfaces of the photodetectors A1-A4 instead of setting two scanning lines on the surface to be scanned, in such a manner that the scanning lines are spaced by a predetermined distance. A controller is then operated so as to correct the differential signals A1-A2, A3-A4 obtained in the preceding step, and the correction of the signals may be carried out by moving the optical deflectors 31, 32. During this time, the lasers ($A_1$, $A_2$), ($A_3$, $A_4$) are provided as shown in FIG. 13, i.e., in such a manner that they are spaced in the vertical direction and staggered in the horizontal direction.

Since n=2 in this embodiment, the photodetectors are disposed so that the distance therebetween becomes $$l' = a' + 2ma' \quad (3)$$

with the distance between the photodetectors on the drum surface satisfying $l = a + 2ma$. In the subscanning direction, the surface to be printed and the surfaces of the photodetectors have conjugate relation. Let M equal a magnification. The following equations can then be obtained (on the assumption that the diameter of the laser beams on the photodetectors and that of the photodetectors are substantially equal).

$$l = Ml'$$

$$a = Ma'$$

The distance l' between the lasers ($A_1$, $A_2$), ($A_3$, $A_4$) in the sub-scanning direction is expressed by the equation (3). The positions of the two laser beams require to be spaced from each other so that the laser beams do not enter the photodetectors $8_1$, $8_2$, simultaneously, so that these lasers may be staggered in the main scanning direction by a distance corresponding to the distance by which the laser beams are thus spaced. Referring to FIG. 12, reference numeral 121 denotes an example of a lens, which consists in this embodiment of a cylinder lens. Regarding this lens, consideration may be given to only the regulation thereof in the sub-scanning direction. Therefore, this lens may consist of a spherical lens.

Figure 12:
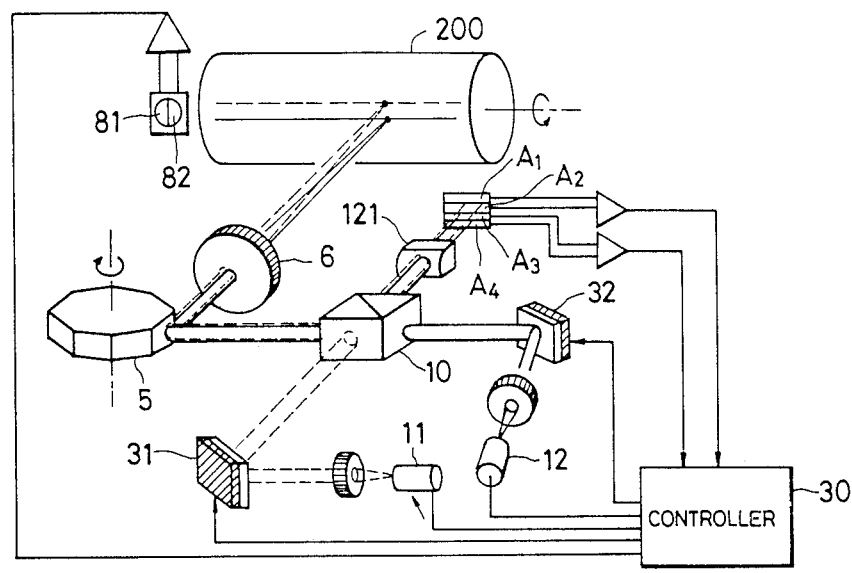
FIG. 12 is a construction diagram of an embodiment of the optical printer using divisional photodetectors bordering each other in the main scanning direction.
Figure 14:
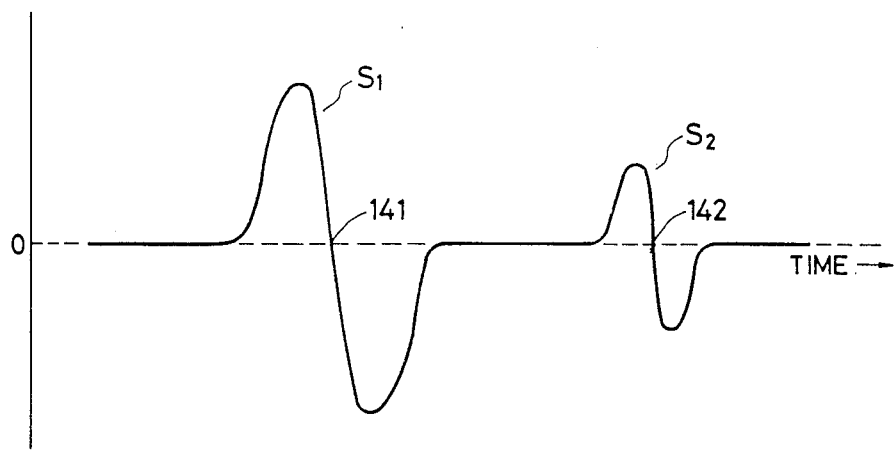
FIG. 14 illustrates a signal representative of detected positions of the laser beams in the main scanning direction.

In the main scanning direction, two divisional photodetectors 81, 82 are provided at one end of a surface to be practically laser-scanned, as shown in FIG. 12. The positions of the laser beams are determined with reference to the time at which the laser beams pass over the photodetectors, and, when a predetermined period of time has thereafter elapsed, printing signals for turning on and off the lasers are generated. During this time, differential signals from the two photodetectors 81, 82 are as shown in FIG. 14, and the time 141, 142 at which the optical outputs $S_1$, $S_2$ cross the zero line are determined as the time at which the laser beams pass over the photodetectors. The reasons why the two divisional photodetectors 81, 82 are used as mentioned above reside in that it is very difficult to set equal the optical outputs from the two lasers and the laser profiles. To stabilize the outputs from the lasers, the light sent out from the ends of the lasers which are on the opposite side of the ends thereof which are used in practice is usually set constant by using monitoring photodetectors disposed near the lasers. However, it is said that the stability of the laser outputs after such a negative feedback control operation is around 5-6%.

Figure 1:
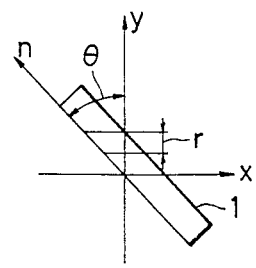
FIG. 1 shows the construction of a principal portion of a known optical printer in which the neighboring line sequential scanning is done with a semiconductor laser array disposed diagonally.
Figure 2:
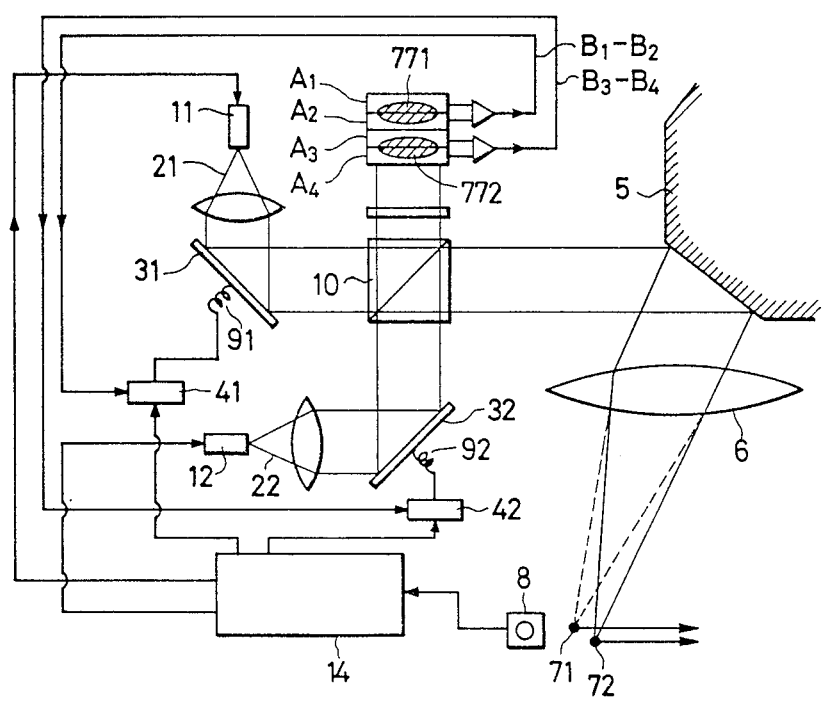
FIG. 2 is a construction diagram of an example of a known optical printer for controlling the space between a plurality of lasers in use in the sub-scanning direction.
Figure 3:
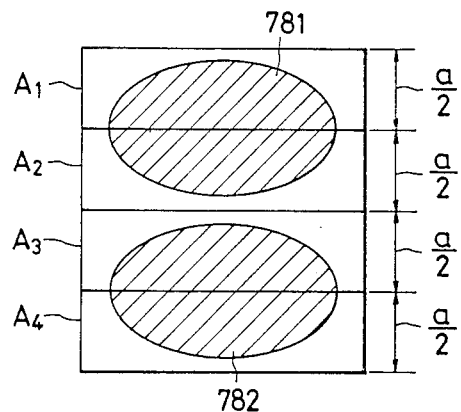
FIG. 3 illustrates an example of a principal portion of a photodetector used to control the optical spots in a neighboring line sequential scanning operation.
Figure 4:
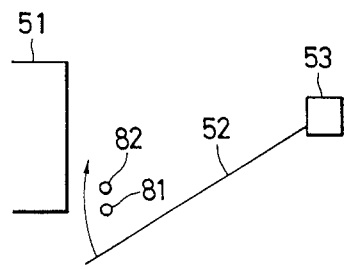
FIG. 4 the detection of the positions of laser beams, using divisional detectors bordering each other in the main scanning direction.
Figure 5:
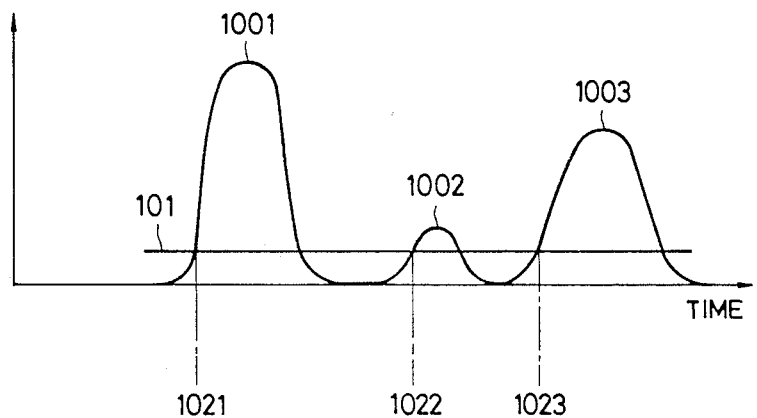
FIG. 5 illustrates the scatter of signals representative of the detected positions and obtained when variations of the intensity of the laser beams occur.

This embodiment is effective in determining the positions of the laser beams accurately in spite of such scatter of the properties thereof. In the case where one photodetector is used, the laser beams have bad influence as described in the statement of the embodiment of FIG. 3, when the levels of outputs from the lasers in use are different.

Figure 15:
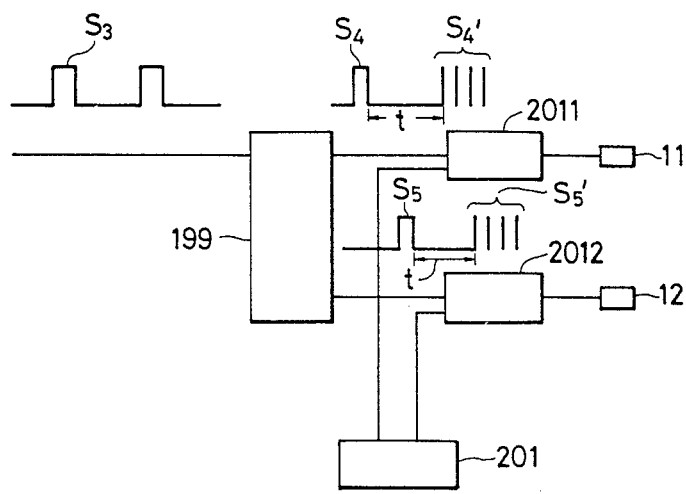
FIG. 15 is a construction diagram of a circuit for applying signals representative of the positions of the laser beams to laser drivers.

According to the present invention, the outputs $S_3$ from two lasers are transmitted as $S_4$, $S_5$ to signal generators 2011, 2022 by using a distributor 199 as shown in FIG. 15, and printing signals $S_4'$, $S_5'$ may be generated a predetermined period of time t after the generation of the signals $S_4$, $S_5$ to drive the lasers 11, 12.

Figure 16:
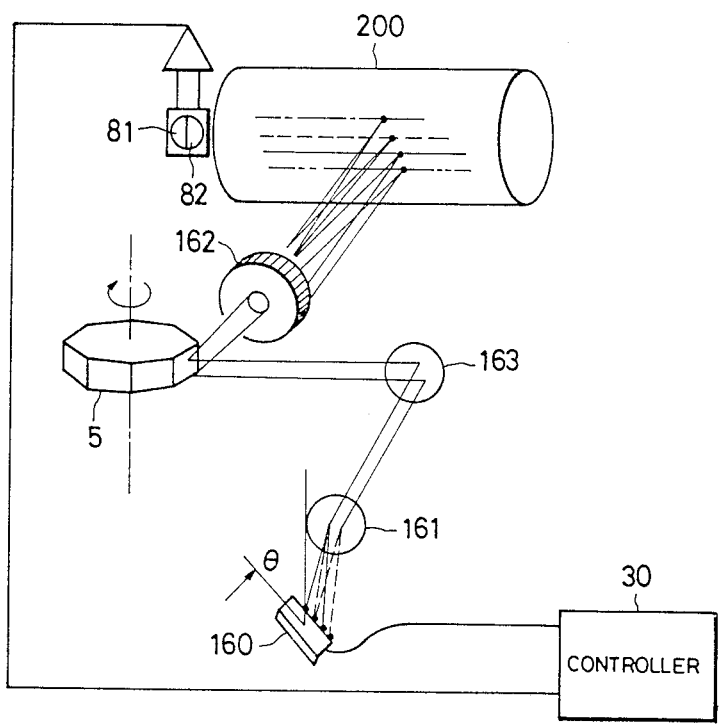
FIG. 16 is a construction diagram showing a principal portion of a further embodiment of the present invention using a semiconductor laser array.

A third embodiment of the present invention will now be described with reference to FIG. 16. In this embodiment, the use of a semiconductor laser array 160 will be discussed. As has already been described, the size of the emitting points in the semiconductor laser array is 1-3 $\mu m \phi$, and the distance between the lasers is kept not less than 50 $\mu m$ so as to prevent the lasers from being electrically and thermally influenced.

A printing plane in which a photosensitive drum 200 is present and the emitting points of the semiconductor lasers also have geometrooptical conjugate relation via lenses 161, 162. Therefore, in order to carry out a neighboring line sequential scanning operation, the semiconductor array 160 may be inclined so as to reduce the distance between the neighboring scanning lines. According to the present invention, the angle $\theta$ is set so as to satisfy the equation (1) and so as not cause a contradiction between the algorithm of the signal sent to the lasers and the optical relation of the equation (1). Accordingly, the present invention has a high degree of freedom of designing. If the value of m in the equation (1) is set suitably large so that this value is substantially equal to the distance between the lasers, the omission and overlapping of the scanning lines can be prevented even if the semiconductor laser array is not inclined to a substantially horizontal level. Reference numeral 163 denotes an optical reflector, 5 a rotary polygon mirror, and 81, 82 two divisional photodetectors.

In the case where the distance l between the adjacent laser beams on the surface of the photosensitive drum and that of the adjacent lasers cannot be set in complete agreement, it is necessary that the semiconductor array be inclined to a certain extent. In this case, the laser beams enter the scanning position detecting photodetectors 81, 82 in order at different points in time. There are two following methods, which are usable during this time, of regulating the time of a signal for sending data to the lasers.

Namely, (1) a semiconductor laser array is made by using the lithographic techniques for semiconductors in many cases. When it is considered that the laser array in use is made so that the distance between the adjacent lasers is set accurate, only the time at which the first laser beam passes over the relative photodetector is detected, and the time at which the other laser beams pass over the relative photodetectors is presumed in advance on the basis of the result of this detection to delay the time at which the printing data are applied to the lasers, and (2) the time at which signals representative of the detected beams from the lasers are obtained is used. In the case where the method (1) does not work sufficiently due to the scatter of the levels of outputs from the lasers, output direction and emitting points, the method (2) can be effectively used. It is the matter of course that using two divisional photodetectors bordering each other in the primary scanning direction causes the scanning accuracy to increase in both of the methods (1) and (2). According to the method (2) in particular, the scatter in the optical properties of the laser array can be absorbed.

According to the present invention, an optical printer capable of carrying out an optical scanning operation without causing the omission and overlapping of the scanning lines even when the neighboring line sequential scanning is not done simultaneously in the sub-scanning direction during an optical scanning operation using a plurality of laser beams can be obtained, and this optical printer enables the conditions attached to the optical system and semiconductor lasers used therein for preventing the occurrence of crosstalk to be eliminated. Moreover, since two divisional photodetectors are used in a main scanning operation, the quality of a printed material does not lower in spite of the scatter of the performance of a plurality of lasers the laser beams from which are used for this scanning operation.

Thus, according to the present invention, a high-quality optical printer using a plurality of laser beams in both the sub-scanning direction and main scanning direction can be obtained.

What is claimed is:

1. An optical printer wherein a plurality of laser beams are used simultaneously for a scanning operation using a single optical deflector, characterized in that the distance between the adjacent laser beams in the sub-scanning direction on a photosensitive body is set in accordance with the equation $l=(n-1)a+m\cdot na$, wherein a is the distance between adjacent printing scanning lines; n the number of said laser beams; and m a positive integer.

2. An optical printer according to claim 1, wherein a laser beam source used as a light source consists of a plurality of discretely formed semiconductor lasers, the distance between the scanning beams in the sub-scanning direction being detected differentially by using divisional detectors, a means for maintaining the distance between the adjacent scanning lines in the sub-scanning direction in a predetermined level by a negative feedback control operation using a signal representative of the differentially detected distance being provided, and two divisional photodetectors bordering each other in the main scanning direction being disposed in a position on the outer side of a print span of said optical printer and corresponding to an end of a surface to be scanned with said laser beams.

3. An optical printer according to claim 1, wherein a semiconductor laser array is used as a light source, said semiconductor array being inclined to regulate the distance between the adjacent laser beams in the sub-scanning direction, and two divisional photodetectors bordering each other in the main scanning direction being provided as detectors for a scanning position in the main scanning direction.

4. An optical printer according to claim 1, wherein said optical printer has a plurality of laser beam sources, a collimator lens and a $F\theta$ lens, said laser beam sources being formed so that the product of $d \times f_2/f_1$, wherein d is the distance between the adjacent laser beam sources; $f_1$ the focal length of said collimator lens; and $f_2$ the focal length of said $F\theta$ lens, can be regulated so as to set the distance l between the adjacent laser beams in the sub-scanning direction to a predetermined level.

* * * * *